May 8, 1951   R. W. NEWTON   2,552,493
WATER SUPPLY SYSTEM
Filed Jan. 24, 1949

INVENTOR
ROY W. NEWTON
BY
Atty

Patented May 8, 1951

2,552,493

UNITED STATES PATENT OFFICE 2,552,493

WATER SUPPLY SYSTEM

Roy William Newton, Collingwood, Victoria, Australia

Application January 24, 1949, Serial No. 72,478
In Australia June 12, 1946

4 Claims. (Cl. 210—94)

This invention relates to water systems applicable for irrigation and various other purposes and is particularly related to such systems where the water sources are rivers, creeks, dams, tanks and other such non-pressure sources and other than such pressure as may arise from the head of water.

As will be well understood, water from such sources is almost bound to contain a considerable amount of foreign matter such as leaves, twigs, moss, feathers, water growth, dead birds and animals and so on, with the result that unless adequate precautions are taken, such foreign matters are inevitably induced into the delivery unit from which the water is to be pumped or delivered by pressure to a desired site and will therefore tend to block or choke or, at least, seriously interfere with the efficient operation of the system.

The present invention provides a simple, effective and practical solution of the problem and will enable the pumping of clear water to be delivered continuously, notwithstanding that the water source is highly charged with foreign matters of the general kind referred to.

Figure 1:
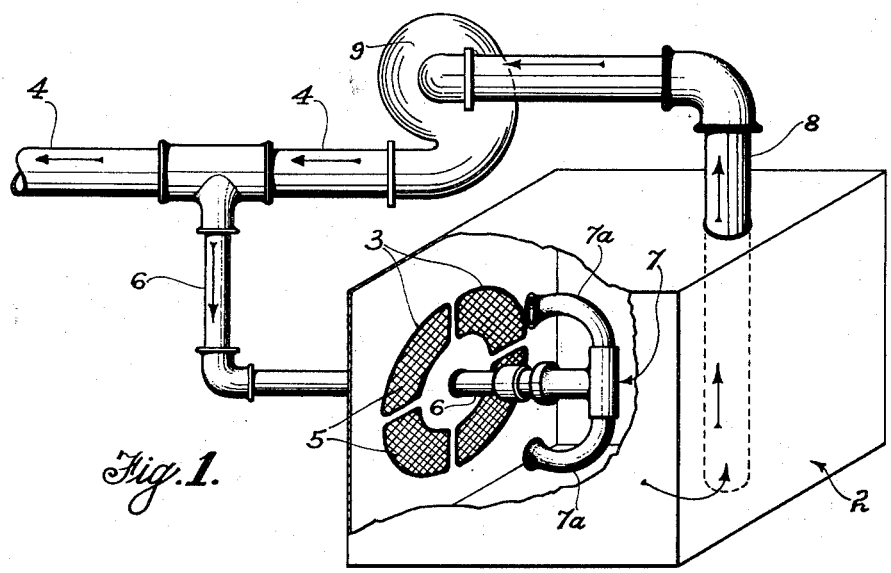
Figure 2:
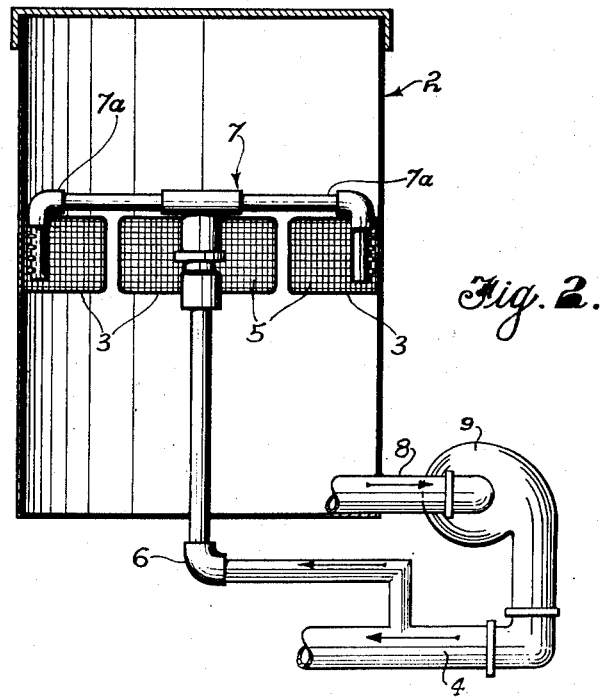

Two forms of the invention are illustrated in the accompanying drawings wherein Figures 1 and 2 are somewhat diagrammatic representations of typical lay-outs.

According to the invention, I provide a filter or water receiving casing 2 which is immersed in the supply source such as a river, creek, dam or the like. This casing may be of any suitable size, shape and construction and is provided with a water inlet, preferably of circular formation which is screened by a suitable foraminous material such as wire netting, perforated plate or the like.

It is considered beneficial that the water inlet should comprise a series of openings 3 (in the form of a ring) in one of the upstanding walls of the casing so as to form a substantially annular entrance for the water. Each opening is covered with a wire netting or other suitable screen 5.

The water delivery pipe line 4, leading from a pump 9 has a by-pass branch 6 reduced relative to pipe 4 with an inlet pipe which extends into the casing 2 and terminates in a spraying device 7 of a rotary character, having its axis of rotation coincident with the centre of the screened water inlet of the casing.

The spraying device 7 may advantageously consist of a T-shaped fitting provided with a number of off-set nozzles 7a such as are well known and which cause the spraying device to rotate while it is in action.

The spray or jets issuing from the nozzles 7a continuously play upon the inner surface of the screens 5 and being under substantial pressure, which is superior to that of the water from the supply source, it follows that such foreign bodies as may tend to block the screened water inlet will be forced away therefrom with the result that the entrance of water into the casing 2 will be unimpeded.

The outlet for the water entering the casing 2 may be in the form of a pipe 8, the lower open end of which is disposed near the bottom of the casing 2 and passes outwardly therefrom to the intake side of the pump.

Although the invention is considered to be applicable to a wide range of specific uses, it will be found to be particularly advantageous for use in conjunction with automatic irrigation systems.

According to Figure 2, the casing 2 is of circular or cylindrical form and provided with a screened water inlet consisting of an annular series of the spaced openings 3 with the covering screens 5 extending around its upstanding wall. A by-pass branch pipe 6 reduced relative to and leading from delivery line 4 has an inlet pipe which projects into the casing centrally thereof and is fitted with a spraying device 7 of the rotary character as above set forth. It will be appreciated that the principle of this embodiment is precisely the same as that previously described, but the construction and arrangement is, in general, to be preferred.

Having now described my invention, what I claim as new and desire to secure by Letters Patent is:

1. A water supply system comprising a tank submerged in a stream or similar body of water containing rubbish and having a screened inlet in a side wall and closed against the entrance of water except at said inlet, an outlet pipe leading from the tank, means connected to the outlet pipe of the tank for drawing filtered clear water from the tank and forcing the same through the outlet pipe, an inlet pipe extending into said tank from the discharge side of said means and having an outlet spray nozzle adjacent to and directed outwardly toward said screened inlet, said inlet pipe branching from the outlet pipe to receive part of the water therefrom under pressure greater than that from the stream for periodically projecting water from said spray nozzle against and through said screened inlet to flush and clear the outside of said screened inlet of rubbish.

2. A water supply system of the type wherein a tank having a screen covered inlet in an upstanding wall thereof and closed against the entrance of water except at said inlet and an outlet pipe leading from near the bottom of the tank through the top of the tank, is adapted to be submerged in a source of water supply, the combination with said tank of an inlet pipe extending into said tank and having a rotatable outlet spraying device adjacent to and directed toward said screen covered inlet, a pump having its inlet side connected to said outlet pipe, a delivery pipe connected to the outlet side of said pump, and a bypass pipe reduced relative to said delivery pipe connecting said delivery pipe with said inlet pipe, whereby a portion of the water from the delivery pipe is projected outwardly from said spraying device through said screen covered inlet to flush and clear the outside of the screen covered inlet of rubbish.

3. A water supply device comprising a tank to be submerged in a source of water supply, a circular screened inlet in an upstanding wall of said tank, said tank being closed against the entrance of water from said source except at said inlet, an outlet pipe leading from within said tank, a pump connected to said outlet pipe, a delivery pipe connected to the discharge side of said pump, a bypass inlet pipe interposed in said delivery pipe and extending into said tank axially of said circular screened inlet, and a cross pipe rotatably mounted on the inner end of said bypass inlet pipe to form a T therewith and having offset spray nozzles at the ends thereof actuated by water pressure in said inlet pipe issuing from the nozzles for rotating said cross pipe and nozzles for projecting water in a circular path under substantial pressure greater than that of the water from the supply source against and outwardly through said circular screened inlet as said cross pipe and nozzles are rotated to progressively flush all foreign matter from the outside of said circular screened inlet to permit unimpeded entrance of water into the submerged tank.

4. A water system having a source of water supply, comprising a tank adapted to be submerged in said source and having an annular series of spaced screen covered inlet openings for said water in an upstanding wall thereof, said tank being closed against inlet of said water except at said openings, an outlet pipe leading from within the tank, a pump having its inlet side connected to said outlet-pipe, a delivery pipe connected to the outlet side of said pump, a bypass branch pipe leading from said delivery pipe forming an inlet pipe extending into said tank centrally of said inlet openings for conveying a portion only of the water in the delivery pipe into the tank, and a rotary spray mounted on the inner end of said inlet pipe and having nozzles adjacent to and directed outwardly toward said inlet openings for projecting jets of water under substantial pressure superior to that of the water from the supply source outwardly against and through said screen covered inlet openings to force away all foreign matter from the outside thereof to permit free entrance of water into the tank from the supply source in which the tank is submerged.

ROY WILLIAM NEWTON.

REFERENCES CITED

The following references are of record in the file of this patent:

UNITED STATES PATENTS

| Number | Name | Date |
|---|---|---|
| 272,596 | Stephens | Feb. 20, 1883 |
| 342,652 | Thacher et al. | May 25, 1886 |
| 372,185 | Thacher et al. | Oct. 25, 1887 |
| 1,611,739 | Hadfield | Dec. 21, 1926 |
| 2,100,482 | Irwine | Nov. 30, 1931 |